June 24, 1947.  A. O. C. NIER ET AL  2,422,921
ADJUSTABLE CAPILLARY LEAK
Filed July 6, 1944

Inventors:
Alfred O. C. Nier
Edward P. Ney
Mark G. Inghram
By: Robert A. Lavender
Attorney Patented June 24, 1947

2,422,921

UNITED STATES PATENT OFFICE 2,422,921

ADJUSTABLE CAPILLARY LEAK

Alfred O. C. Nier, New York, N. Y., Edward P. Ney, Charlottesville, Va., and Mark G. Inghram, New York, N. Y., assignors to the United States of America, as represented by the Director of the Office of Scientific Research and Development Application July 6, 1944, Serial No. 543,699

11 Claims. (Cl. 251—5)

This invention relates generally to a device for controlling the flow of small quantities of fluid and, more particularly, to an adjustable capillary leak for gases or vapors.

One of the applications of a device of this character is in the control of the gas being fed into a mass spectrometer. The amounts of gas used in analysis of gas in a mass spectrometer are small in volume and are fed to the mass spectrometer in an attenuated flow. Ordinary means of controlling such a stream are insensitive, complicated and inadequate.

When regulating the flow of small quantities of gas, as attenuated and at as low a pressure as in this case, a conventional valve acting to reduce the stream at one point in a supply line is too coarse of adjustment for easy and efficient operation. What we have discovered is that the flow of attenuated gases at low pressures can be accurately controlled by varying the frictional resistance to the flow in a portion of tubing forming a part of the supply line and thus varying the loss of head, and, consequently, the rate of flow. The quantity of gas flowing through the tubing is determined by the pressure or head on the gas and the frictional resistance within the pipes and tubing. If the resistance to the flow of the gas is increased and the pressure remains the same, the mass flow of gas past a given point is accordingly reduced.

It is therefore, an object of this invention to provide an improved means for controllably feeding fluid in small quantities.

It is another object of this invention to provide means for governing the flow of an attenuated stream of fluid through capillary tubing.

It is a further object to provide readily controlled means for producing slight changes in the flow of small quantities of gas or vapor.

This invention has as another object to provide means for regulating the flow of a gas or vapor by increasing and decreasing the size of the aperture made by the passage within the tubing.

It is a still further and specific object to provide an adjustable capillary leak for regulating the flow of gas to a mass spectrometer.

In the embodiment to be disclosed in detail, the adjustable capillary leak of this invention comprises a rotatable shaft on which a flattened tubing is wound spirally around and fastened to the shaft so that rotation of the shaft either increases or decreases the size of capillary passages in the tubing, and suitable means for rotating the shaft to make and maintain such an adjustment.

The foregoing and other features of this invention contributing to its simplicity of construction and dependability in operation will be apparent from the following detailed description of a preferred embodiment taken with the accompanying drawings, in which.

Figures 1, 2:
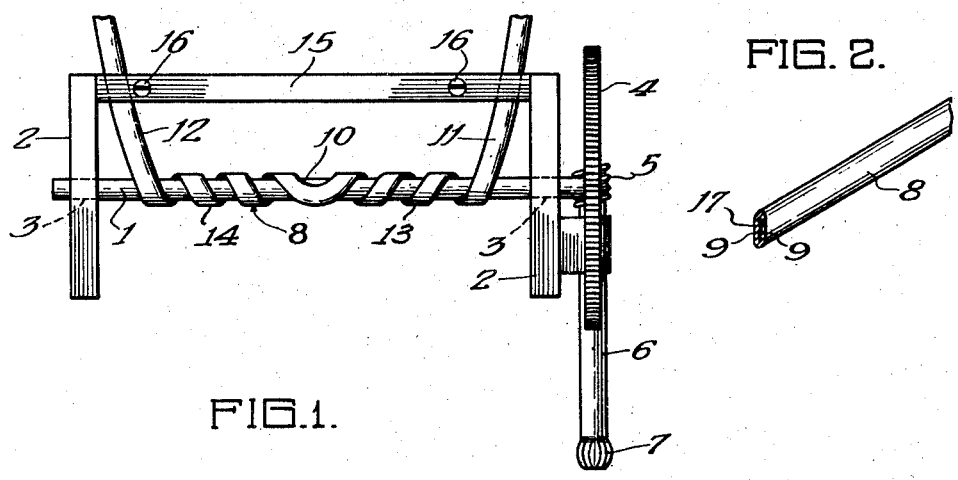
Fig. 1 is a top plan view of the adjustable capillary leak.
Fig. 2 is an enlarged perspective view of a section of the flattened capillary tubing.
Figures 3, 4:
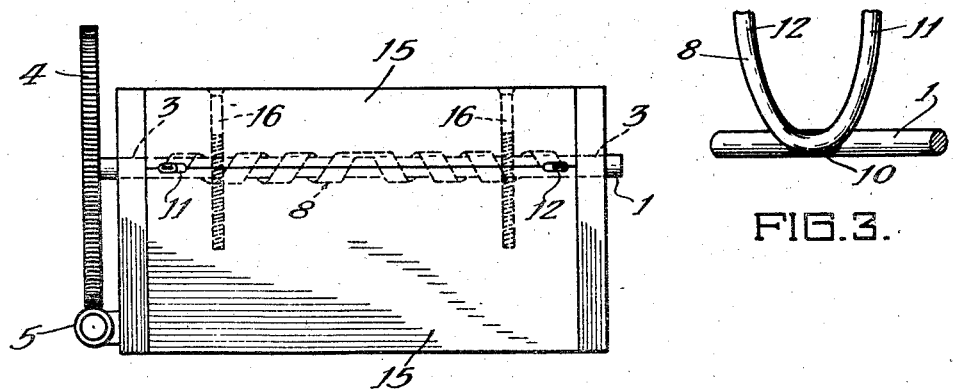
Fig. 3 is a plan view of a bent section of the capillary tubing showing the manner of fastening it to the shaft.
Fig. 4 is a front view of the adjustable capillary leak.

With reference to Fig. 1, a shaft 1 is mounted in a frame 2 and is conveniently rotatable in spaced journal openings 3, 3 in frame 2 by means of a worm wheel 4 and an interengaging worm 5 turned by a spindle 6. Spindle 6 is manually operable and has a knurled knob 7 at its end for the purpose. A tubing 8 of corrosion resisting material is formed from a piece of tubing, preferably copper, of from one-eighth of an inch to one-quarter of an inch in outer diameter and one to two feet in length. The center portion of the tubing 8 is flattened until the walls collapse, leaving narrow passages 17 between the contiguous or nearly contiguous inner walls 9, as shown in Fig. 2, through which an attenuated flow of gas or fluid may be passed. The center of the flattened portion of tubing 8 is then bent into approximately U-shape and the apex of the bend is brazed, soldered or otherwise suitably secured to the shaft 1 at a point 10, as shown in Fig. 3. The two arms 11 and 12 of tubing 8 are spirally wound around shaft 1 (three-sixteenths of an inch in diameter) in opposite directions from the point 10. That is to say, as viewed in Fig. 1, the coiled arm 11 is wound around the shaft 1 to form a left-handed helix 13, and the coiled arm 12 is wound around the shaft to form a right-handed helix 14. Fig. 4 shows the ends of the two arms 11 and 12 extending from the shaft 1 and rigidly held in frame 2 by opposed clamping members 15, 15 tightened by screws 16, 16, thereby fixing the arms 11 and 12 to a relatively stationary object.

Arm 11 is intended to be connected to the supply of gas, vapor, or other fluid that is to pass through the leak, and arm 12 is intended to be connected to the closed system of a mass spectrometer or other device into which the gas or other fluid is being fed. Shaft 1 is fastened in the relatively stationary member or frame 2 so as to be freely rotatable either clockwise or counter-clockwise in the journal openings 3, 3. Tubing 8, anchored in the frame 2 by clamping members 15, 15 and fastened to the rotatable shaft 1 at point 10, and being of flexible material, will permit the coil to loosen or tighten upon relative rotation of shaft 1 and frame 2.

The counter-clockwise rotation of shaft 1 as viewed from the right side of Fig. 1 causes the helixes 13 and 14 to tighten, decreasing the radius of curvature thereof and causing tubing 8 to be drawn flatter. This flattening of the tubing causes a decrease in the size of the narrow passages 17 in the flattened portion of the tubing 8, with a consequent increase in resistance to the flow of fluid therethrough. Conversely, clockwise rotation of the shaft 1 loosens helixes 13 and 14 and increases the size of the narrow passages 17, consequently decreasing the resistance to the flow of fluid. Therefore, tightening of the helixes 13 and 14 increases the resistance to the flow of fluid through the tubing 8 and loosening the helixes 13 and 14 decreases the resistance to the flow of fluid through the tubing 8. These results are obtained because the tightening of the helixes 13 and 14 causes the clearances between the inner walls 9 of tubing 8, defining the passages therethrough, to become more constricted. By increasing and decreasing the resistance to the flow of fluid the mass flow of the fluid is accordingly decreased or increased.

While the coiled tubing 8 ordinarily will tend to maintain its adjustment or curvature setting by reason of the physical properties of the material of which it is formed, it is preferable to employ self-locking worm gearing (4 and 5) in order accurately to make and maintain the desired adjustment.

In operation, the gaseous fluid enters through the arm 11 and flowing through the coils of the helixes 13 and 14 is delivered to the mass spectrometer or other device through arm 12. When an increase in the quantitative rate of flow is desired, the shaft 1 is rotated in a clockwise direction (viewed from the right of Fig. 1), loosening the helixes 13 and 14. When a decrease in the rate or quantity of flow is sought, the shaft 1 is rotated in a counter-clockwise direction, tightening the helixes 13 and 14.

Although in this illustrative embodiment, copper is given as the preferred material for the tubing, it is noted that any other material having the necessary flexibility and malleability may be employed. We have shown the tubing coiled into helixes, but the effect is the same if the tubing is bent into a spiral or some other shape in which the radius of curvature of the bend and consequently the aperture through the tubing may be varied.

In addition to providing a capillary leak embodying the novel concept of obstructing the fluid flow by variably compressing a length of malleable tubing the present invention is significantly unique in the means disclosed for producing and controlling the requisite compression of the tubing.

While reference has been made herein to a capillary leak, tubing or passage, it is to be understood that operation of the device of this invention does not depend upon capillary action, and that the term "capillary" is used for convenience to denote the aperture or passage size of the tubing through which gas or vapor is passed at a very low rate.

It will be apparent to those skilled in the art that various modifications can be made in size, proportion and relative arrangement of parts without departing from the principles of the invention as disclosed herein, and for that reason it is not intended that it should be limited other than as may be required by the scope of the appended claims.

We claim:

1. In a device for regulating the flow of small amounts of fluid, the combination comprising a rotatable shaft, and a flexible tubing coiled about said shaft, said tubing having a portion connected with the shaft for rotation therewith, whereby the radius of curvature of the coil and passage size of the coiled tubing may be varied by rotation of the shaft.

2. In a device for regulating the flow of small amounts of gas, the combination comprising a rotatable shaft, and a flexible tubing having a flattened portion coiled about said shaft, said tubing being connected to the shaft at one point for corresponding rotation therewith, whereby the radius of curvature of the coil and passage size of the coiled tubing may be increased or decreased by appropriate rotation of the shaft.

3. A device for regulating the flow of small amounts of fluid including a coiled tubing of flexible malleable material having a capillary passage therein and means connected with said tubing for increasing and decreasing the radius of curvature of the coil to vary the passage size.

4. A device for regulating the passage of gas comprising a flexibled coiled tubing, and two members relatively rotatable with respect to each other, said coiled tubing having separate portions fixed to each of said members whereby to increase or decrease the radius of curvature of the coil upon relative rotation of said members.

5. A device for regulating the passage of gas comprising a flexible coiled tubing of copper, a rotatable member, and a stationary member, said coiled tubing being fastened at spaced points to the rotary and stationary members respectively to increase or decrease in radius of curvature of the coil and passage size of the coiled tubing upon actuation of said rotatable member.

6. A device for regulating the flow of small amounts of gas to a closed system comprising a flexible tubing, a rotatable shaft, and a stationary member, said tubing being wound around said shaft and fastened at spaced portions to said shaft and said stationary member respectively, whereby to increase or decrease in radius of curvature of the wound portion of the tubing upon rotation of said shaft.

7. An adjustable capillary leak comprising a rotatable shaft, a stationary member, a flexible tubing wound around the shaft to form a helix, a portion of said tubing being fastened to said shaft for rotation therewith, and a portion of said tubing being fastened to said stationary member, and means for turning the shaft and setting the radius of curvature of the helix.

8. An adjustable capillary leak for controlling the flow of gas or vapor comprising a rod, means for rotatably supporting the rod, and a copper tubing including a flattened portion wound around the rod to form two flat helixes extending in opposite directions from an intermediate portion, said copper tubing being secured to the rod by its intermediate portion, whereby rotation of the rod will vary the passage size of the tubing helixes.

9. An adjustable capillary leak comprising a shaft, spaced members rotatably supporting said shaft, a flexible tubing having a flattened intermediate portion wound around the shaft to form two flat helixes extending in opposite directions from a central portion, the central portion of said tubing being joined with the shaft for rotation therewith and the opposite ends of the tubing being respectively connected with the spaced members, and means for turning the shaft.

10. An adjustable capillary leak comprising a shaft, a frame including spaced members rotatably supporting said shaft, a flexible tubing having a flattened intermediate portion wound around the shaft to form two flat helixes extending in opposite directions from a central portion, the central portion of said tubing being fastened to the shaft for rotation therewith and the opposite ends of the tubing being respectively secured to the frame, and self-locking worm gearing for turning the shaft to tighten or loosen the helixes of the tubing and for holding the tubing in a desired adjustment.

11. An adjustable capillary leak comprising a shaft, a flexible tubing having a flattened intermediate portion wound around the shaft to form two flat helixes extending in opposite directions from a central portion, said central portion of said tubing being joined with the shaft for rotation therewith, a frame, said frame being composed of spaced members rotatably supporting said shaft and clamping members securing the opposite ends of the tubing, and means for turning the shaft to vary the size of the inside passage formed in the tubing.

ALFRED O. C. NIER.
EDWARD P. NEY.
MARK G. INGHRAM.

REFERENCES CITED

The following references are of record in the file of this patent:

UNITED STATES PATENTS

| Number | Name | Date |
|---|---|---|
| 662,955 | McClelland | Dec. 4, 1900 |
| 1,416,603 | Brater | May 16, 1922 |
| 1,340,828 | Heap | May 18, 1920 |
| 1,983,213 | Brady | Dec. 4, 1934 |